(12) United States Patent
Kanzaki et al.

(10) Patent No.: US 8,912,764 B2
(45) Date of Patent: Dec. 16, 2014

(54) POWER CONTROL UNIT AND CONTROL METHOD FOR POWER CONTROL UNIT

(75) Inventors: Takao Kanzaki, Miyoshi (JP); Eiji Kitano, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 353 days.

(21) Appl. No.: 13/574,920

(22) PCT Filed: Jan. 25, 2010

(86) PCT No.: PCT/JP2010/050878
§ 371 (c)(1),
(2), (4) Date: Jul. 24, 2012

(87) PCT Pub. No.: WO2011/089723
PCT Pub. Date: Jul. 28, 2011

(65) Prior Publication Data
US 2012/0293138 A1    Nov. 22, 2012

(51) Int. Cl.
*H02J 7/00* (2006.01)
*H02M 3/158* (2006.01)
*B60L 11/12* (2006.01)
*B60L 11/14* (2006.01)

(52) U.S. Cl.
CPC ........... *H02M 3/1588* (2013.01); *B60L 11/123* (2013.01); *B60L 11/14* (2013.01); *B60L 2210/10* (2013.01); *B60L 2210/40* (2013.01); *Y02T 10/7077* (2013.01); *Y02T 10/7005* (2013.01); *Y02T 10/7241* (2013.01); *Y02T 10/7022* (2013.01); *Y02T 10/7216* (2013.01); *Y02T 10/6217* (2013.01)
USPC ....................................................... 320/166

(58) Field of Classification Search
USPC ................................. 320/166, 167
See application file for complete search history.

(56) References Cited

U.S. PATENT DOCUMENTS

| 7,109,605 B2* | 9/2006 | Habu .............................. 307/39 |
| 7,471,003 B2* | 12/2008 | Kobayashi et al. ......... 290/40 C |
| 8,174,241 B2* | 5/2012 | Kojima et al. ................ 320/134 |
| 8,222,871 B2* | 7/2012 | Leboeuf ........................ 320/167 |
| 2009/0230917 A1* | 9/2009 | Kojima et al. ................ 320/101 |

FOREIGN PATENT DOCUMENTS

| JP | 2002-238251 A | 8/2002 |
| JP | 2004-201439 A | 7/2004 |
| JP | 2006-141158 A | 6/2006 |
| JP | 2006-197723 A | 7/2006 |
| JP | 2006-224772 A | 8/2006 |
| JP | 2007-181308 A | 7/2007 |

OTHER PUBLICATIONS

International Search Report of PCT/JP2010-050878 dated Apr. 6, 2010.

* cited by examiner

*Primary Examiner* — Edward Tso
*Assistant Examiner* — Ramy Ramadan
(74) *Attorney, Agent, or Firm* — Sughrue Mion, PLLC (57) ABSTRACT

A power control unit is provided with a converter; a filter capacitor that is connected onto one side of converter; a smoothing capacitor that is connected onto the other side of converter; an MG-ECU that is operated to control converter with power supplied from filter capacitor; and a casing that houses these constituent elements therein. In order to electrically discharge filter capacitor and smoothing capacitor, an MG-ECU controls converter in such a manner as to alternately repeat ON/OFF of an npn-type transistor for a lower arm of an IPM and ON/OFF of an npn-type transistor for an upper arm of IPM, and further, to set a time of ON of npn-type transistor for the upper arm longer than that of ON of npn-type transistor for the lower arm.

6 Claims, 10 Drawing Sheets

POWER CONTROL UNIT AND CONTROL METHOD FOR POWER CONTROL UNIT

CROSS REFERENCE TO RELATED APPLICATIONS

This application is a National Stage of International Application No. PCT/JP2010/050878 filed Jan. 25, 2010, the contents of all of which are incorporated herein by reference in their entirety.

TECHNICAL FIELD

The present invention relates to a power control unit and a control method for a power control unit and, more particularly, to a technique for electrically discharging a capacitor housed inside of the power control unit.

BACKGROUND ART

A hybrid vehicle and an electric vehicle having an electric motor to be used as a drive source have been conventionally known. Power is supplied to the electric motor from a battery mounted on the vehicle. Power stepped up by, for example, a converter is supplied to the electric motor. An electric circuit for supplying the power to the electric motor is provided with capacitors such as a filter capacitor for eliminating noise and a smoothing capacitor for smoothing a voltage.

Although the capacitors effectively function when the vehicle travels, electric charges reserved in the capacitors are not needed during stoppage of the vehicle. If the electric charges are reserved for a longer period of time than necessary, this may bring about an adverse effect such as promotion of degradation of the capacitors. In view of this, there has been proposed a technique for electrically discharging the capacitors.

Japanese Patent Laying-Open No. 2004-201439 (PTL 1) discloses a voltage conversion system that can consume electric charges reserved in a capacitor without using an electric discharge resistance. The voltage conversion system is provided with a power supply, an inverter, a voltage converter, first and second capacitors, and a controller. The voltage converter is connected between the power supply and the inverter. The first capacitor is inserted onto the power supply side in the voltage converter whereas the second capacitor is inserted onto the inverter side in the voltage converter. The controller controls the voltage converter in such a manner as to consume residual electric charges in the first capacitor and residual electric charges in the second capacitor in response to a stop signal.

CITATION LIST

Patent Literature

PTL 1: Japanese Patent Laying-Open No. 2004-201439

SUMMARY OF INVENTION

Technical Problem

However, when a decrease in voltage of the power supply in the controller stops the power supply to the controller in the voltage conversion system disclosed in Japanese Patent Laying-Open No. 2004-201439, the voltage converter may not be controlled in such a manner as to consume the residual electric charges in the capacitors. As a consequence, the electric discharging may be stopped even at a high voltage of the capacitors.

The present invention has been accomplished to solve the above-described problems. An object of the present invention is to electrically discharge a capacitor properly.

Solution to Problem

A power control unit includes: a converter that outputs a voltage higher than or equal to a voltage on one side from the other side whereas outputs a voltage lower than or equal to the voltage on the other side from the one side; a first capacitor connected onto the one side of the converter; a second capacitor connected onto the other side of the converter; a controller that operates to control the converter with power reserved in the first capacitor and supplied to the controller; and a casing that houses therein the first capacitor, the second capacitor, the converter, and the controller. The converter includes: a first switching element connected between a positive electrode terminal and a negative electrode terminal in the first capacitor; and a second switching element connected between the positive electrode terminal in the first capacitor and a positive electrode terminal in the second capacitor. The controller controls the converter so as to alternately turn on the first switching element and the second switching element and prolong a time at which the second switching element is ON more than a time at which the first switching element is ON, in order to electrically discharge the first capacitor and the second capacitor.

With the above-described configuration, the power is supplied from the first capacitor to the controller for controlling the capacitor. For example, when the first capacitor and the second capacitor are controlled to be electrically discharged, the first switching element connected between the positive electrode terminal and the negative electrode terminal in the first capacitor and the second switching element connected between the positive electrode terminal in the first capacitor and the positive electrode terminal in the second capacitor are alternately turned on. Here, the time at which the second switching element is ON is prolonged more than the time at which the first switching element is ON. In this manner, the first capacitor and the second capacitor can be electrically discharged such that the difference between a voltage at the first capacitor and a voltage at the second capacitor becomes small. Therefore, when the voltage at the second capacitor is high, the voltage at the first capacitor serving as the power supply for the controller can be kept to properly operate the controller. As a consequence, until the voltage at the first capacitor is decreased less than a lower limit of a voltage at which the controller can be properly operated at the cause of the decrease in voltage at the second capacitor, the converter can be controlled so as to electrically discharge the first capacitor and the second capacitor properly.

In another embodiment, the controller controls the converter such that the first switching element and the second switching element are operated in a predetermined duty ratio.

With the above-described configuration, the duty ratio of the converter when the first capacitor and the second capacitor are electrically discharged can be kept constantly. Consequently, the ratio of the voltage at the first capacitor to the voltage at the second capacitor can be kept constantly.

In yet another embodiment, the controller controls the converter so as to decrease frequencies at which the first switching element and the second switching element are operated during electric discharging of the first capacitor and the second capacitor.

With the above-described configuration, the current flowing in the converter can be increased as possible by reducing the frequency at which the first switching element and the second switching element are operated. Consequently, the voltage at the first capacitor and the voltage at the second capacitor can be speedily reduced.

A controlling method for a power control unit is a controlling method for a power control unit that includes a converter that outputs a voltage higher than or equal to a voltage on one side from the other side whereas outputs a voltage lower than or equal to the voltage on the other side from the one side, a first capacitor connected onto the one side of the converter, a second capacitor connected onto the other side of the converter, a controller that operates to controls the converter with power reserved in the first capacitor and supplied to the controller, and a casing that houses therein the first capacitor, the second capacitor, the converter, and the controller. The converter includes a first switching element connected between a positive electrode terminal and a negative electrode terminal in the first capacitor; and a second switching element connected between the positive electrode terminal in the first capacitor and a positive electrode terminal in the second capacitor. The controlling method includes the step of: controlling the converter so as to alternately turn on the first switching element and the second switching element and prolong a time at which the second switching element is ON more than a time at which the first switching element is ON, in order to electrically discharge the first capacitor and the second capacitor.

With the above-described configuration, the power is supplied from the first capacitor to the controller for controlling the capacitor. For example, when the first capacitor and the second capacitor are controlled to be electrically discharged, the first switching element connected between the positive electrode terminal and the negative electrode terminal in the first capacitor and the second switching element connected between the positive electrode terminal in the first capacitor and the positive electrode terminal in the second capacitor are alternately turned on. Here, the time at which the second switching element is ON is prolonged more than the time at which the first switching element is ON. In this manner, the first capacitor and the second capacitor can be electrically discharged such that the difference between a voltage at the first capacitor and a voltage at the second capacitor becomes small. Therefore, when the voltage at the second capacitor is high, the voltage at the first capacitor serving as the power supply for the controller can be kept to properly operate the controller. As a consequence, until the voltage at the first capacitor is decreased less than a lower limit of a voltage at which the controller can be properly operated at the cause of the decrease in voltage at the second capacitor, the converter can be controlled so as to electrically discharge the first capacitor and the second capacitor properly.

In still another embodiment, the step of controlling the converter includes the step of controlling the converter such that the first switching element and the second switching element are operated in a predetermined duty ratio.

With the above-described configuration, the duty ratio of the converter when the first capacitor and the second capacitor are electrically discharged can be kept constantly. Consequently, the ratio of the voltage at the first capacitor to the voltage at the second capacitor can be kept constantly.

In still another embodiment, the step of controlling the converter includes the step of controlling the converter so as to decrease frequencies at which the first switching element and the second switching element are operated during electric discharging of the first capacitor and the second capacitor.

With the above-described configuration, the current flowing in the converter can be increased as possible by reducing the frequency at which the first switching element and the second switching element are operated. Consequently, the voltage at the first capacitor and the voltage at the second capacitor can be speedily reduced.

Advantageous Effects of Invention

The present invention properly achieves the electric discharging of the first capacitor and the second capacitor.

DESCRIPTION OF EMBODIMENTS

A preferred embodiment according to the present invention will be described below with reference to the attached drawings. In the following description, the same component parts are designated by the same reference numerals, and further, their names and functions are the same as each other. Therefore, the detailed description of them will not be repeated.

Figure 1:
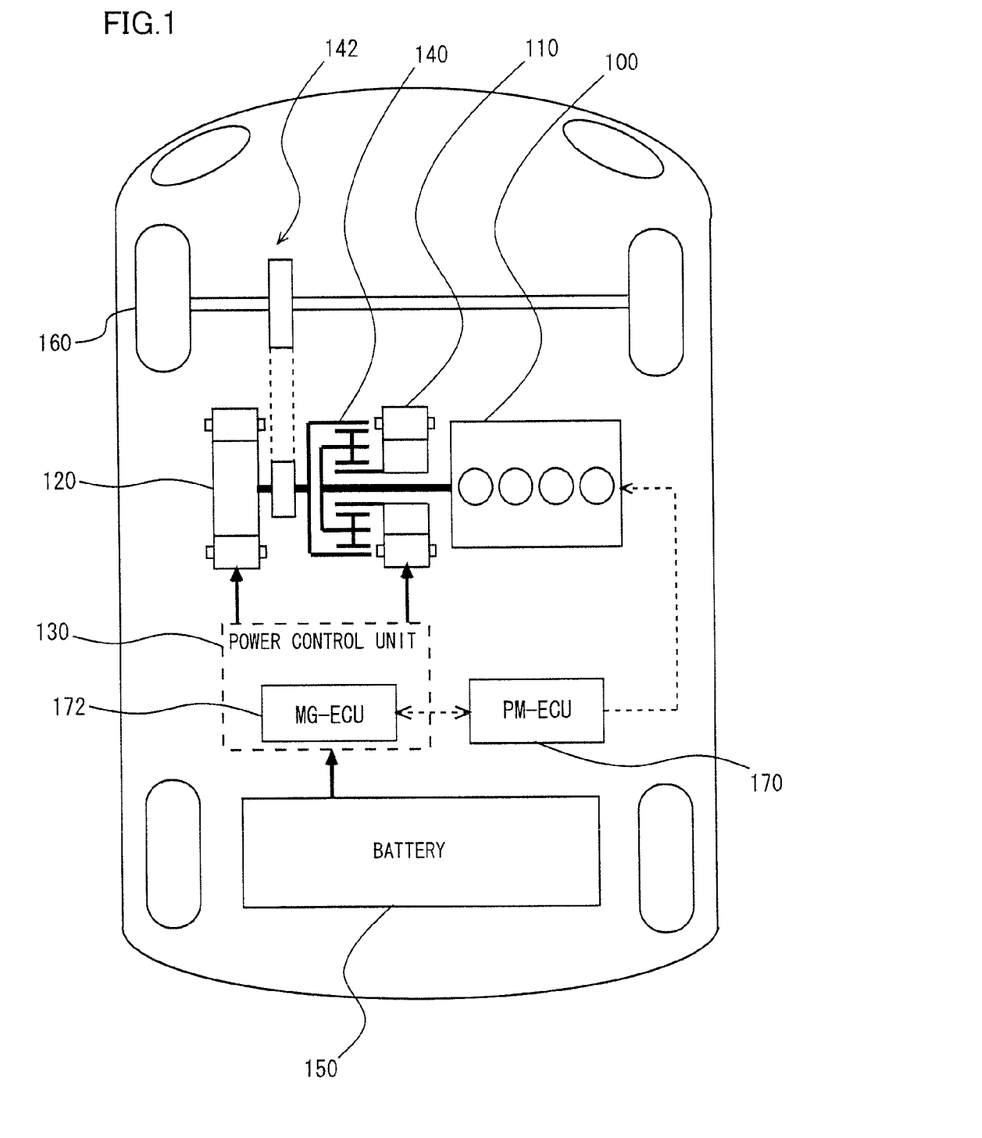
FIG. 1 is a diagram schematically illustrating a hybrid vehicle.

Referring to FIG. 1, a description will be given of a hybrid vehicle having a power control unit mounted thereon in a preferred embodiment according to the present invention. Here, the hybrid vehicle may be replaced with an electric vehicle having only an electric motor as a drive source.

The hybrid vehicle has an engine 100, a first Motor Generator (MG) 110, a second MG 120, a power control unit 130, a power split device 140, and a battery 150.

This vehicle travels by drive force transmitted from at least either one of engine 100 and second MG 120. Engine 100 and second MG 120 are controlled in such a manner that, for example, output power from engine 100 and output power from second MG 120 bear target output power of the vehicle set based on an accelerator position, a vehicular speed, and the like. The output power from engine 100 and the output power from second MG 120 bear the target output power of the vehicle at an optimum rate in consideration of various parameters such as fuel efficiency and an output limit.

Engine 100, first MG 110, and second MG 120 are connected to each other via power split device 140. Power generated in engine 100 is split into two channels by power split device 140. One of the channels is a channel for driving front wheels 160 via a decelerator 142. The other channel is a channel for driving first MG 110 so as to generate power.

First MG 110 is a three-phase AC generator provided with a U-phase coil, a V-phase coil, and a W-phase coil. First MG 110 generates power by the power of engine 100 that is split by power split device 140. The power generated by first MG 110 is distributed according to a vehicular travel status or a residual capacity of battery 150, that is, an SOC (abbreviating a state of charge). For example, the power generated by first MG 110 is used for driving second MG 120 as it is during normal traveling. In contrast, in the case where the SOC of battery 150 is lower than a predetermined value, the power generated by first MG 110 is converted from an AC to a DC by an inverter, described later. Thereafter, a voltage is decreased by a converter, described later, to be thus reserved in battery 150.

When first MG 110 functions as a generator, first MG 110 generates a negative torque. Here, the negative torque signifies torque acting as a load on engine 100. In contrast, first MG 110 functions as a motor upon receipt of the power supply, first MG 110 generates a positive torque. Here, the positive torque signifies torque that cannot become a load on engine 100, that is, torque that assists the rotation of engine 100. The same goes for second MG 120.

Second MG 120 is a three-phase AC generator provided with a U-phase coil, a V-phase coil, and a W-phase coil. Second MG 120 is driven by at least either one of the power reserved in battery 150 and the power generated by first MG 110.

The drive force of second MG 120 is transmitted to front wheels 160 via decelerator 142. As a consequence, second MG 120 assists engine 100 or allows the vehicle to travel by its drive force. Incidentally, second MG 120 may drive rear wheels in place of or as well as front wheels 160.

During regenerative braking of the hybrid vehicle, second MG 120 is driven by front wheels 160 via decelerator 142, and then, acts as a generator. In this manner, second MG 120 functions as a regenerative brake for converting braking energy into power. The power generated by second MG 120 is reserved in battery 150.

The power is supplied from battery 150 to first MG 110 and second MG and vice versa via power control unit 130. Power control unit 130 will be described later.

Power split device 140 is constituted of a planetary gear train including a sun gear, a pinion gear, a carrier, and a ring gear. The pinion gear meshes with the sun gear and the ring gear. The carrier supports the pinion gear in a rotatable manner. The sun gear is connected to a rotary shaft of first MG 110. The carrier is connected to a crankshaft of engine 100. The ring gear is connected to a rotary shaft of second MG 120 and decelerator 142.

Figure 2:
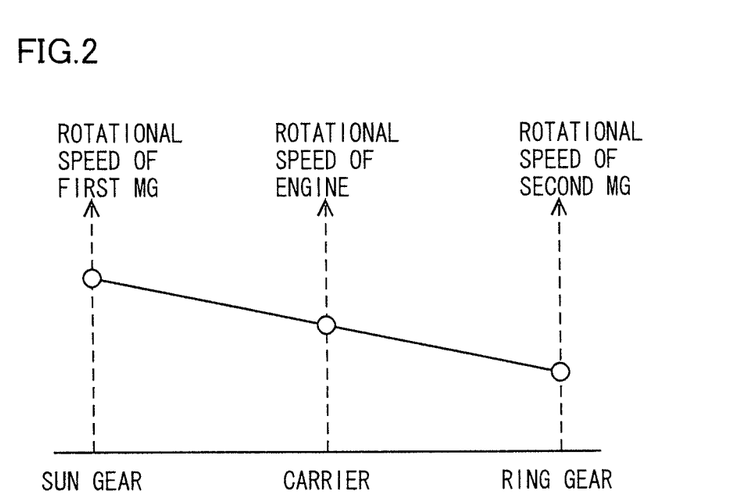
FIG. 2 is a nomographic chart illustrating a power split device.

Engine 100, first MG 110, and second MG 120 are connected to each other via power split device 140 constituted of the planetary gear train, and therefore, the interrelationship among the rotational speeds of engine 100, first MG 110, and second MG 120 is linear, as illustrated in a nomographic chart of FIG. 2.

Returning to FIG. 1, battery 150 is a combined battery obtained by connecting in series a plurality of battery modules, each of which consists of a plurality of battery cells integrated with each other. A voltage of battery 150 is set to, for example, about 200 V.

In the present preferred embodiment, engine 100 is controlled by a Power train Manager (PM)-Electronic Control Unit (ECU) 170. First MG 110 and second MG 120 are controlled by an MG-ECU 172. PM-ECU 170 and MG-ECU 172 are connected in such a manner as to bidirectionally communicate. PM-ECU 170 instructs MG-ECU 172 on the generation power of first MG 110 and the drive power of second MG 120.

Figure 3:
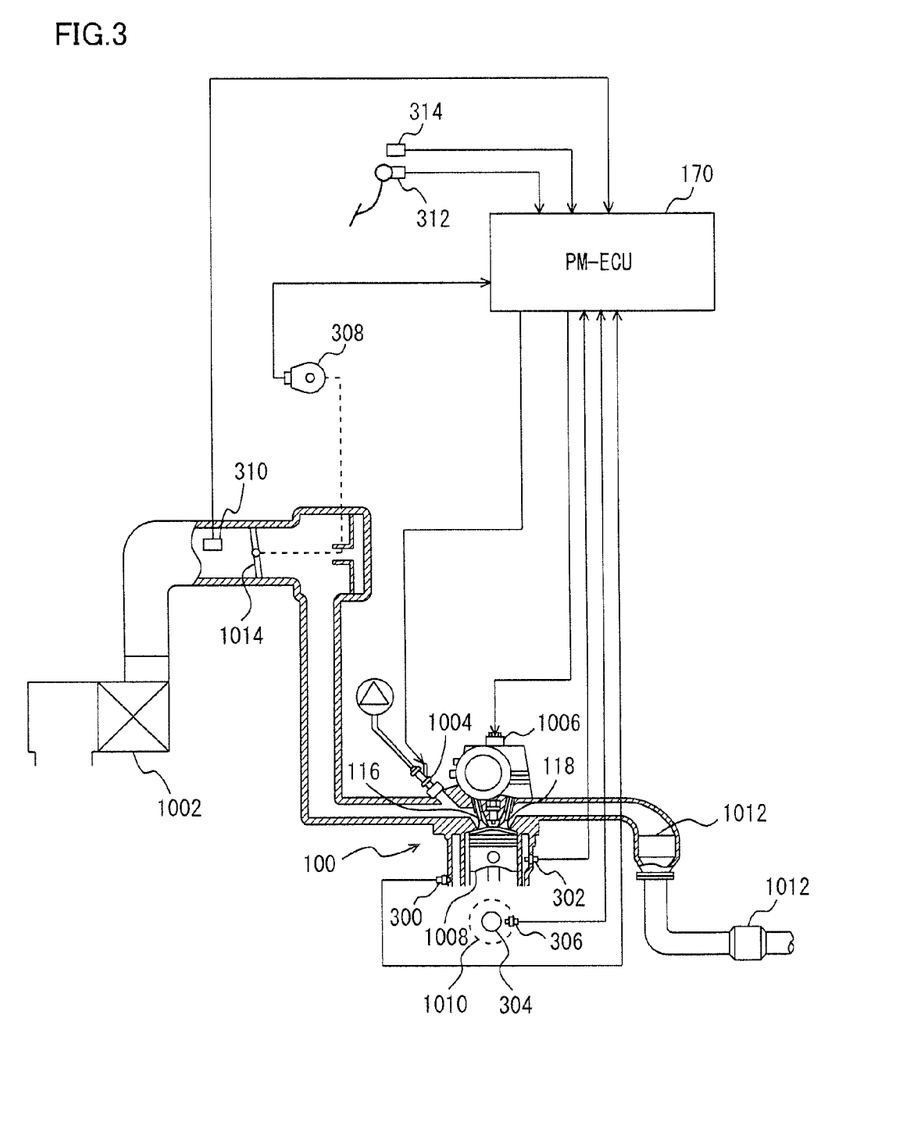
FIG. 3 is a view showing an engine.

Referring to FIG. 3, engine 100 will be further described below. Engine 100 is an internal combustion engine that ignites an air-fuel mixture of air taken in through an air cleaner 1002 and fuel injected by an injector 1004 by an ignition plug 1006 inside of a combustion chamber for the purpose of combustion. An ignition timing is controlled to be an Minimum advance for Best Torque (MBT), at which an output torque becomes maximum. Here, the ignition timing is retarded or advanced according to the operational status of engine 100 in the case of knocking.

Upon the combustion of the air-fuel mixture, a combustion pressure depresses a piston 1008, thereby rotating a crankshaft 1010. The air-fuel mixture after the combustion (i.e., exhaust gas) is purified with a tertiary catalyst 1012 provided in engine 100, and then, is discharged to the outside of the vehicle. When tertiary catalyst 1012 is warmed up to a specified temperature, thereby exhibiting a purification function. A quantity of air taken into engine 100 is adjusted by a throttle valve 1014.

To PM-ECU 170 for controlling engine 100 are connected a knock sensor 300, a water temperature sensor 302, a crank position sensor 306 disposed oppositely to a timing rotor 304, a throttle opening position sensor 308, an air flow meter 310, an accelerator press-down degree sensor 312, and a vehicular speed sensor 314.

Knock sensor 300 is disposed in a cylinder block of engine 100. Knock sensor 300 is constituted of a piezoelectric element. Knock sensor 300 generates a voltage caused by vibration of engine 100. The magnitude of the voltage corresponds to that of the vibration. Knock sensor 300 transmits a signal representing the voltage to PM-ECU 170.

Water temperature sensor 302 detects a temperature of cooling water staying in a water jacket in engine 100, and then, transmits a signal representing a detection result to PM-ECU 170.

Timing rotor 304 is disposed in crankshaft 1010, and thus, is rotated together with crankshaft 1010. Timing rotor 304 has a plurality of projections at predetermined intervals therearound. Crank position sensor 306 is disposed in a manner facing the projection of timing rotor 304. When timing rotor 304 is rotated, an air gap between the projection of timing rotor 304 and crank position sensor 306 is varied, and therefore, a magnetic flux passing a coil unit in crank position sensor 306 is increased or decreased, thereby generating electromotive force in the coil unit. Crank position sensor 306 transmits a signal representing the electromotive force to PM-ECU 170. PM-ECU 170 detects a crank angle and an engine rotational speed NE (i.e., a rotational speed of crankshaft 1010) in response to the signal transmitted from crank position sensor 306.

Throttle opening position sensor 308 detects an opening position of throttle, and then, transmits a signal representing a detection result to PM-ECU 170.

Air flow meter 310 detects the quantity of air taken into engine 100, and then, transmits a signal representing a detection result to PM-ECU 170.

Accelerator position sensor 312 detects an accelerator position, and then, transmits a signal representing a detection result to PM-ECU 170. Vehicular speed sensor 314 detects a vehicular speed, and then, transmits a signal representing a detection result to PM-ECU 170.

Figure 4:
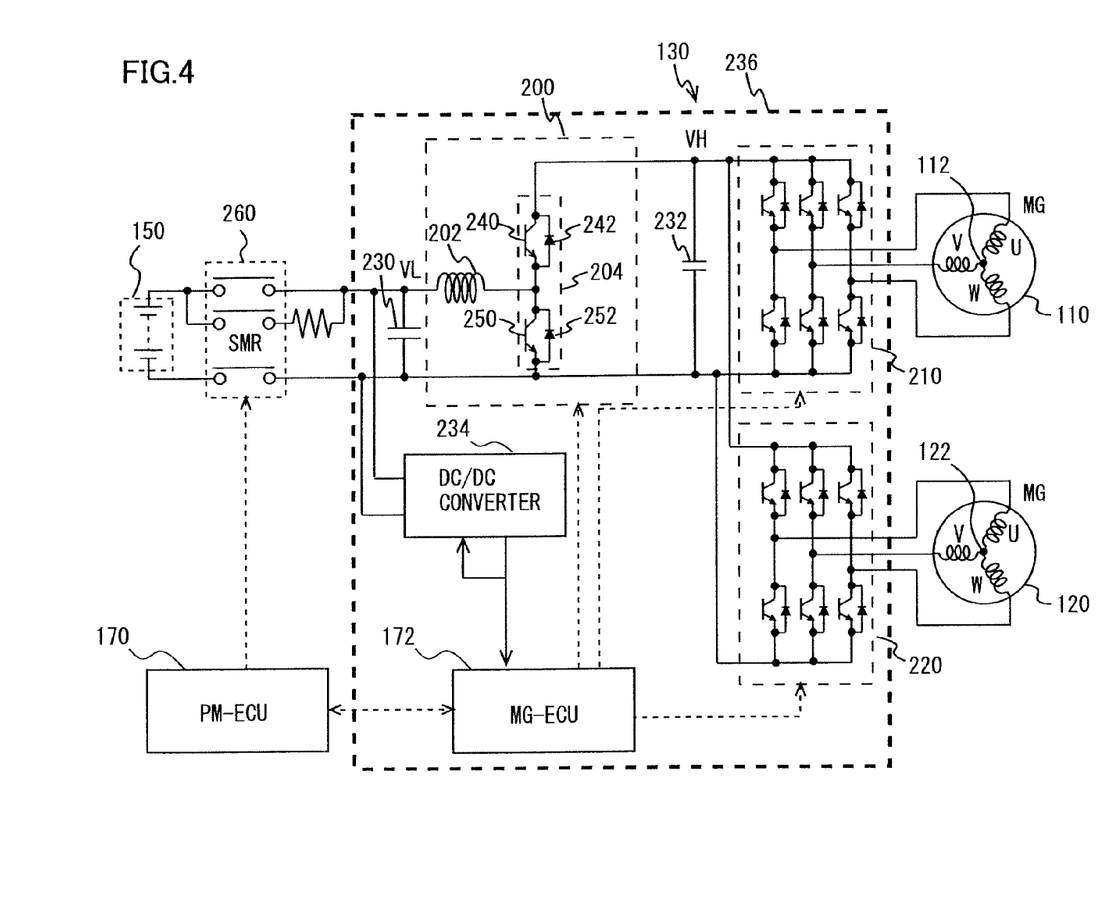
FIG. 4 is a diagram illustrating a power control unit.

Referring to FIG. 4, a description will be given of power control unit 130. Power control unit 130 includes MG-ECU 172, a converter 200, a first inverter 210, a second inverter 220, a filter capacitor 230, a smoothing capacitor 232, a DC/DC converter 234, and a casing 236 that houses these constituent elements therein.

MG-ECU 172 is operated to control converter 200, first inverter 210, and second inverter 220 in response to a signal output from PM-ECU 170 or the like.

Converter 200 is operated according to a duty ratio (i.e., a ratio of an ON time to an OFF time) determined in MG-ECU 172. Converter 200 includes a reactor 202 and an IPM (abbreviating an intelligent power module) 204. IPM 204 includes an npn-type transistor 240 as an upper arm, a diode 242 to be connected to npn-type transistor 240 in such a manner as to allow a current to flow from an emitter side onto a collector side in npn-type transistor 240, another npn-type transistor 250 as a lower arm, and a diode 252 to be connected to npn-type transistor 250 in such a manner as to allow a current to flow from an emitter side onto a collector side in npn-type transistor 250.

Npn-type transistor 240 and npn-type transistor 250 are switching elements. Npn-type transistor 240 is connected between a terminal on a positive electrode side of filter capacitor 230 and a terminal on a positive electrode side of smoothing capacitor 232. Npn-type transistor 250 is connected between the terminal on the positive electrode side and a terminal on a negative electrode side in filter capacitor 230. Npn-type transistor 240 and npn-type transistor 250 are connected in series to each other. Npn-type transistor 240 and npn-type transistor 250 are controlled by MG-ECU 172.

Here, an Insulated Gate Bipolar Transistor (IGBT), for example, may be used as the npn-type transistor. The npn-type transistor may be replaced with a power switching element such as a power Metal Oxide Semiconductor Field-Effect Transistor (MOSFET).

Reactor 202 is connected at one end thereof onto a positive electrode side of battery 150 whereas at the other end thereof to a connection point between npn-type transistor 240 and npn-type transistor 250.

When power electrically discharged from battery 150 is supplied to first MG 110 or second MG 120, a voltage is stepped up by converter 200. To the contrary, when the power generated by first MG 110 or second MG 120 is electrically charged to battery 150, the voltage is stepped down by converter 200.

That is to say, converter 200 outputs, from one side connected to smoothing capacitor 232, a voltage higher than that on the other side connected to filter capacitor 230. To the contrary, converter 200 outputs, from one side, a voltage lower than that on the other side.

First inverter 210 includes a U-phase arm, a V-phase arm, and a W-phase arm. The U-phase arm, the V-phase arm, and the W-phase arm are connected in parallel to each other. Each of the U-phase arm, the V-phase arm, and the W-phase arm has two npn-type transistors connected in series to each other. A diode for allowing a current to flow from an emitter side onto a collector side is connected between a collector and an emitter in each of the npn-type transistors. A connection point between the npn-type transistors at each of the arms is connected to a terminal different from a neutral point 112 of each of coils in first MG 110.

First inverter 210 converts a DC current that is supplied from battery 150 into an AC current, and then, supplies the AC current to first MG 110. Moreover, first inverter 210 converts an AC current generated in first MG 110 into a DC current.

Second inverter 220 includes a U-phase arm, a V-phase arm, and a W-phase arm. The U-phase arm, the V-phase arm, and the W-phase arm are connected in parallel to each other. Each of the U-phase arm, the V-phase arm, and the W-phase arm has two npn-type transistors connected in series to each other. A diode for allowing a current to flow from an emitter side onto a collector side is connected between a collector and an emitter in each of the npn-type transistors. A connection point between the npn-type transistors at each of the arms is connected to a terminal different from a neutral point 122 of each of coils in second MG 120.

Second inverter 220 converts a DC current that is supplied from battery 150 into an AC current, and then, supplies the AC current to second MG 120. Moreover, second inverter 220 converts an AC current generated in second MG 120 into a DC current.

Filter capacitor 230 is interposed between battery 150 and converter 200 so as to eliminate noise. Smoothing capacitor 232 is interposed between converter 200 and two inverters 210 and 220 so as to smooth an output voltage from converter 200. In other words, filter capacitor 230 is connected onto one side (i.e., an input side) of converter 200 whereas smoothing capacitor 232 is connected onto the other side (i.e., an output side).

DC/DC converter 234 is adapted to step down a voltage (i.e., a voltage at battery 150) VL on the side of filter capacitor 230, and then, outputs the voltage. The power output from DC/DC converter 234 is used for actuating MG-ECU 172 and DC/DC converter 234.

Casing 236 houses therein MG-ECU 172, converter 200, first inverter 210, second inverter 220, filter capacitor 230, smoothing capacitor 232, and DC/DC converter 234.

Casing 236 is firmly formed so as to protect MG-ECU 172, converter 200, first inverter 210, second inverter 220, filter capacitor 230, smoothing capacitor 232, and DC/DC converter 234 from an impact exerted externally.

Battery 150 serving as the power supply is connected outside of casing 236. Specifically, to filter capacitor 230 is connected battery 150 outside of casing 236. A System Main Relay (SMR) 260 is interposed between filter capacitor 230 and battery 150, that is, between power control unit 130 and battery 150.

SMR 260 is configured to switch electric connection and disconnection between filter capacitor 230 (i.e., power control unit 130) and battery 150. When SMR 260 is opened, filter capacitor 230 (i.e., power control unit 130) is disconnected from battery 150. To the contrary, when SMR 260 is closed, filter capacitor 230 (i.e., power control unit 130) is connected to battery 150.

The status of SMR 260 is controlled by PM-ECU 170. For example, when PM-ECU 170 is started, SMR 260 is closed. When the OFF signal is transmitted from PM-ECU 170 upon stoppage of the vehicle or the like, SMR 260 is opened.

For example, when SMR 260 is closed during a normal actuation, MG-ECU 172 operates, with power supplied from the battery 150 through DC/DC converter 234, to control converter 200, first inverter 210, and second inverter 220.

Moreover, when SMR 260 is opened, MG-ECU 172 can operate, with power reserved in filter capacitor 230 and supplied through DC/DC converter 234, to control converter 200, first inverter 210, and second inverter 220. In other words, filter capacitor 230 is used as a power supply for MG-ECU 172.

In the present preferred embodiment, MG-ECU 172 controls converter 200 to operate in a predetermined duty ratio to electrically discharge filter capacitor 230 upon receipt of a discharge instructing signal from PM-ECU 170 during, for example, stoppage. Additionally, MG-ECU 172 controls converter 200 to operate in the predetermined duty ratio to electrically discharge smoothing capacitor 232. Filter capacitor 230 and smoothing capacitor 232 are electrically discharged in an alternate manner.

More specifically, in order to electrically discharge filter capacitor 230 and smoothing capacitor 232, the ON/OFF of npn-type transistor 250 for the lower arm of IPM 204 and the ON/OFF of npn-type transistor 240 for the upper arm of IPM 204 are alternately repeated. That is to say, npn-type transistor 240 is turned off during the ON of npn-type transistor 250, and in contrast, npn-type transistor 240 is turned on during the OFF of npn-type transistor 250. Moreover, a time when npn-type transistor 240 for the upper arm is ON (i.e., a time when npn-type transistor 250 for the lower arm is OFF) is longer than a time when npn-type transistor 240 for the upper arm is OFF (i.e., a time when npn-type transistor 250 for the lower arm is ON). In other words, the duty ratio of npn-type transistor 240 for the upper arm is set to higher than 50%, and in contrast, the duty ratio of npn-type transistor 250 for the lower arm is set to lower than 50%. For example, the duty ratio of npn-type transistor 250 for the lower arm is kept to about 10%. Here, the duty ratio is not limited to this example.

The duty ratio of converter 200 in electrically discharging filter capacitor 230 and smoothing capacitor 232 is determined by, for example, a Engineer based on results of experiments, simulations, and the like. For example, the duty ratio of converter 200 in electrically discharging filter capacitor 230 and smoothing capacitor 232 is determined such that voltage VL of filter capacitor 230 is substantially equal to a voltage VH of smoothing capacitor 232.

When filter capacitor 230 and smoothing capacitor 232 are electrically discharged, the power reserved in filter capacitor 230 is supplied to MG-ECU 172 via DC/DC converter 234.

Moreover, when filter capacitor 230 and smoothing capacitor 232 are electrically discharged, IPM 204 is operated at the same frequency as those during power running and regenerating.

Figure 5:
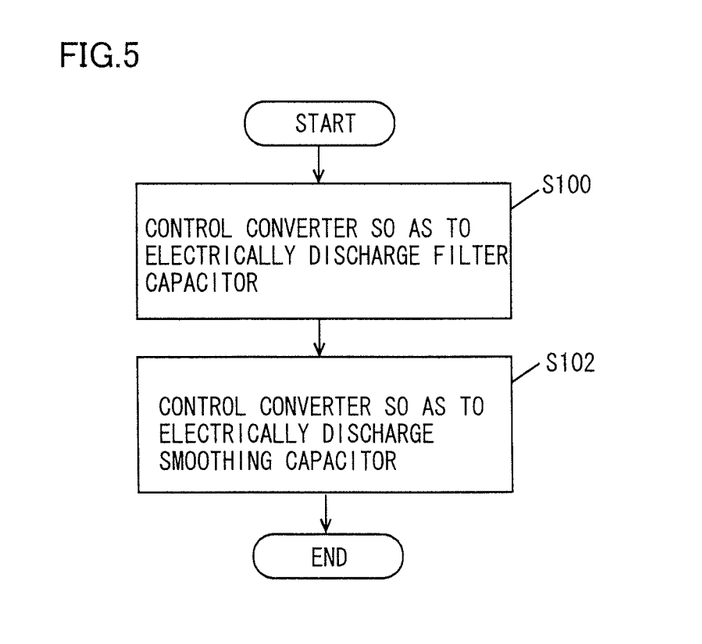
FIG. 5 is a flowchart illustrating a control structure of a program to be executed by an MG-ECU.

Referring to FIG. 5, a description will be given of a control structure of a program to be executed by MG-ECU 172. The program described below is executed upon receipt of the discharge instructing signal from PM-ECU 170 during stoppage.

In step (hereinafter abbreviated as "S") 100, MG-ECU 172 controls converter 200 so as to electrically discharge filter capacitor 230.

In S102, MG-ECU 172 controls converter 200 so as to electrically discharge smoothing capacitor 232.

Next, a description will be given below of an actuation mode of power control unit 130 in the present preferred embodiment based on the above-described structure and the flowchart.

Upon receipt of the discharge instructing signal from PM-ECU 170, MG-ECU 172 controls converter 200 so as to electrically discharge filter capacitor 230 (S100), and further, controls converter 200 so as to electrically discharge smoothing capacitor 232 (S102).

The ON/OFF of npn-type transistor 250 for the lower arm of IPM 204 and the ON/OFF of npn-type transistor 240 for the upper arm of IPM 204 are alternately repeated in the predetermined duty ratio, so that filter capacitor 230 and smoothing capacitor 232 are electrically discharged in the alternate manner.

Figure 6:
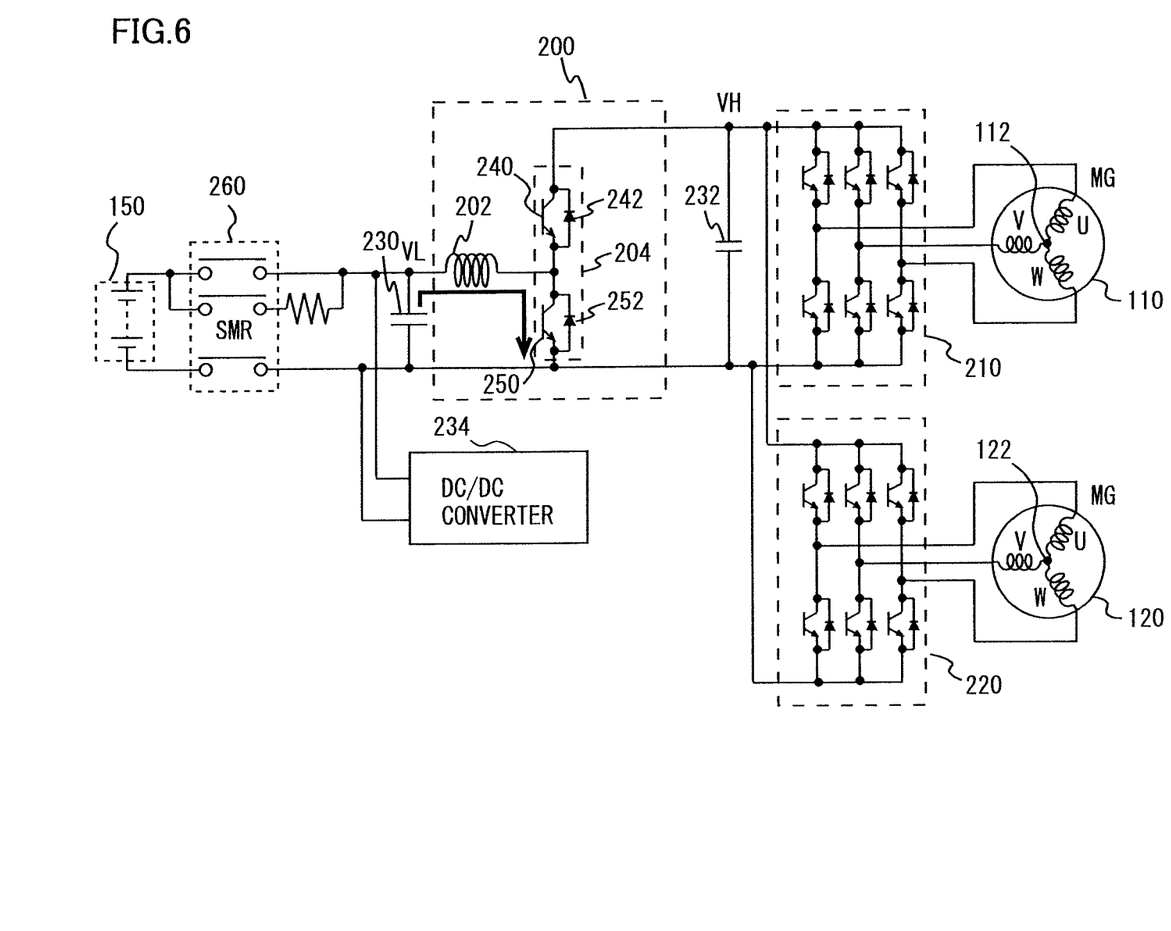
FIG. 6 is a first diagram illustrating a flow of power.

When npn-type transistor 240 for the upper arm is OFF whereas npn-type transistor 250 for the lower arm is ON, the power electrically discharged from filter capacitor 230 flows in reactor 202 and npn-type transistor 250 for the lower arm, as indicated by an arrow in FIG. 6. Consequently, electric charges remaining in filter capacitor 230 can be consumed by a loss of reactor 202 and a loss of npn-type transistor 250 for the lower arm of IPM 204.

Figure 7:
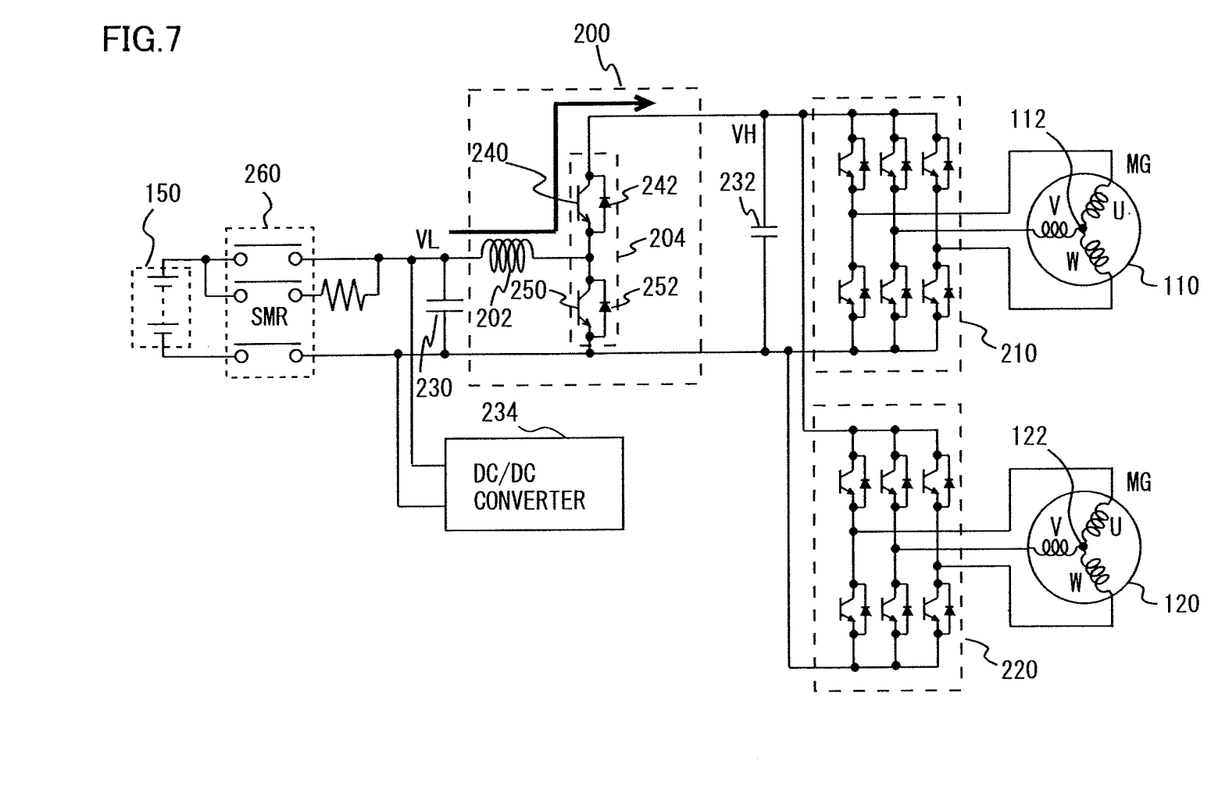
FIG. 7 is a second diagram illustrating the flow of the power.

Thereafter, when npn-type transistor 240 for the upper arm is kept to be OFF while npn-type transistor 250 for the lower arm is turned off, the power flows from reactor 202 toward diode 242 for the upper arm of IPM 204 due to characteristics of reactor 202, as indicated by an arrow in FIG. 7. Consequently, the power can be further consumed by the loss of reactor 202 and a loss of diode 242 for the upper arm of IPM 204.

Figure 8:
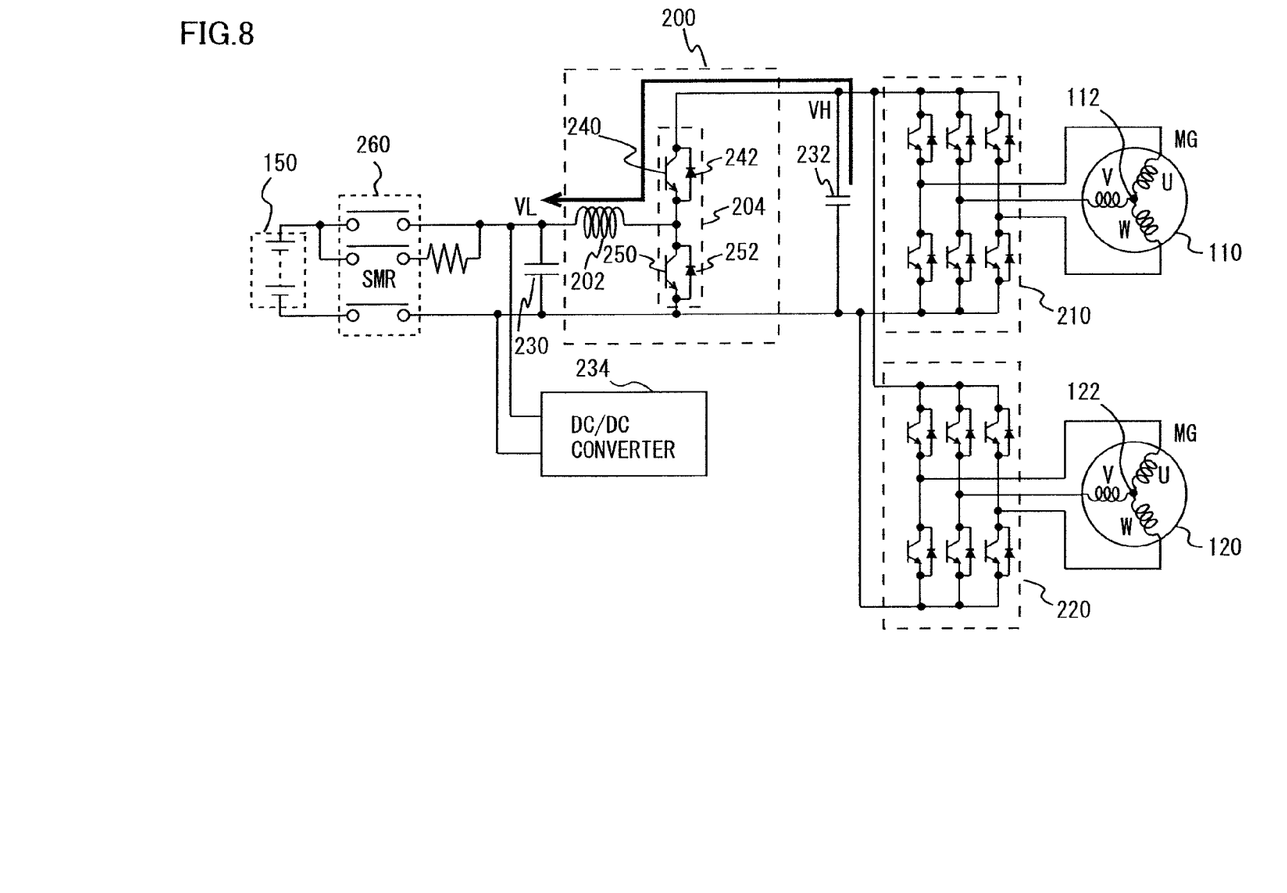
FIG. 8 is a third diagram illustrating the flow of the power.

Furthermore, when npn-type transistor 250 for the lower arm is kept to be OFF while npn-type transistor 240 for the upper arm is turned on, the power electrically discharged from smoothing capacitor 232 flows in reactor 202 and npn-type transistor 240 for the upper arm, as indicated by an arrow in FIG. 8. Consequently, electric charges remaining in smoothing capacitor 232 can be consumed by the loss of reactor 202 and a loss of npn-type transistor 240 for the upper arm of IPM 204.

Figure 9:
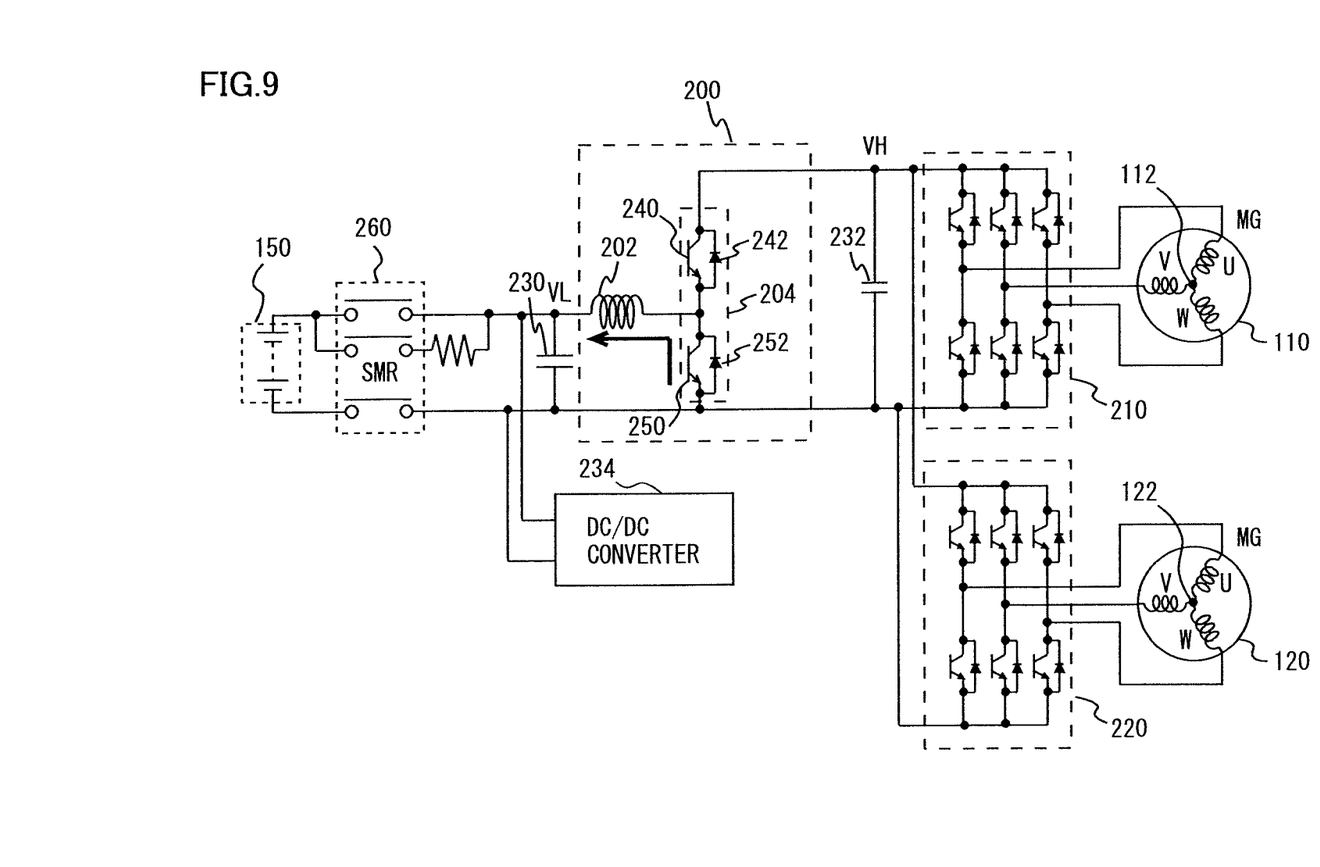
FIG. 9 is a fourth diagram illustrating the flow of the power.

Subsequently, when npn-type transistor 250 for the lower arm is kept to be OFF while npn-type transistor 240 for the upper arm is turned off, the power flows from diode 252 for the lower arm of IPM 204 toward reactor 202 due to the characteristics of reactor 202, as indicated by an arrow in FIG. 9. Consequently, the power can be still further consumed by the loss of reactor 202 and a loss of diode 252 for the lower arm of IPM 204.

In electrically discharging smoothing capacitor 232, the time when npn-type transistor 240 for the upper arm is ON (i.e., the time when npn-type transistor 250 for the lower arm is OFF) is longer than the time when npn-type transistor 240 for the upper arm is OFF (i.e., the time when npn-type transistor 250 for the lower arm is ON).

Hence, filter capacitor 230 and smoothing capacitor 232 can be electrically discharged such that a difference between voltage VL of filter capacitor 230 and voltage VH of smoothing capacitor 232 becomes small. Therefore, when voltage VH of smoothing capacitor 232 is high, voltage VL of filter capacitor 230 serving as the power supply for MG-ECU 172 can be kept so as to properly operate MG-ECU 172. As a consequence, converter 200 can be controlled such that filter capacitor 230 and smoothing capacitor 232 are electrically discharged properly until voltage VL of filter capacitor 230 is decreased down to less than or equal to a lower limit at which MG-ECU 172 can be properly operated caused by a decrease in voltage VH of smoothing capacitor 232. In other words, voltage VL of filter capacitor 230 and voltage VH of smoothing capacitor 232 can be satisfactorily decreased.

Moreover, converter 200 is controlled to be operated in the predetermined duty ratio, so that the ratio of the voltage of filter capacitor 230 to the voltage of smoothing capacitor 232 during the electric discharging can be set constantly. In this manner, the voltages of filter capacitor 230 and smoothing capacitor 232 are easily kept at substantially the same value. Thus, the voltage of filter capacitor 230 can be much preferably kept.

Here, when filter capacitor 230 is connected to battery 150, filter capacitor 230 is kept to be supplied with the power from battery 150. As a consequence, filter capacitor 230 cannot be electrically discharged.

On the other hand, even when filter capacitor 230 is connected to battery 150, smoothing capacitor 232 can be electrically discharged until voltage VL of filter capacitor 230 and voltage VH of smoothing capacitor 232 become the same as each other. Therefore, converter 200 is controlled so as to electrically discharge filter capacitor 230 and smoothing capacitor 232 irrespective of whether SMR 260 is closed or opened. That is to say, even when SMR 260 is closed, converter 200 is controlled so as to electrically discharge filter capacitor 230 and smoothing capacitor 232. Consequently, at least the voltage of smoothing capacitor 232 is decreased.

Thereafter, when SMR 260 is opened, not only the voltage of smoothing capacitor 232 but also the voltage of filter capacitor 230 is decreased.

In this manner, the electric discharging can be completed earlier by the electric discharging of smoothing capacitor 232 before SMR 260 cuts off filter capacitor 230 from battery 150.

Figure 10:
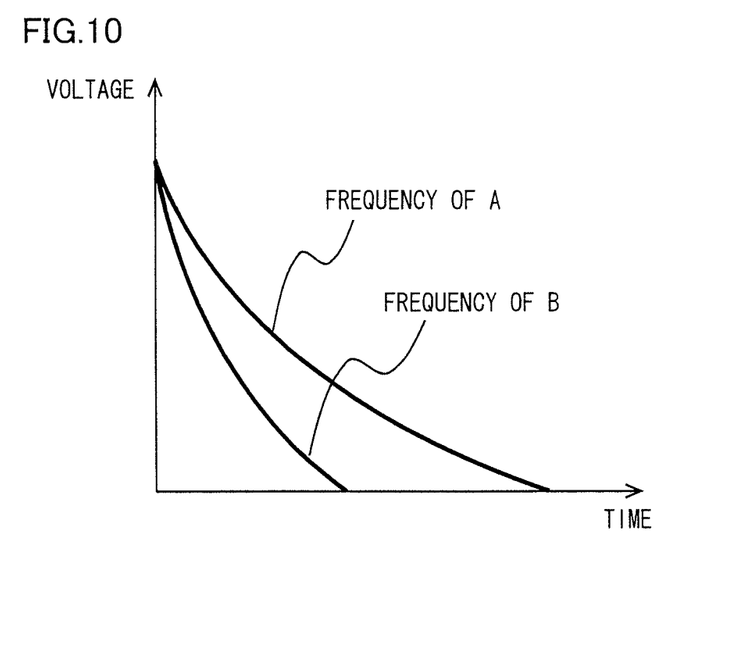
FIG. 10 is a graph illustrating a voltage when an IPM is operated at a frequency of A and a voltage when the IPM is operated at a frequency of B.

Incidentally, as illustrated in FIG. 10, a speed at which voltage VL of filter capacitor 230 and voltage VH of smoothing capacitor 232 are decreased when IPM 204 is operated at a frequency of A (wherein A designates a positive value) is lower than a speed at which voltage VL of filter capacitor 230 and voltage VH of smoothing capacitor 232 are decreased when IPM 204 is operated at a frequency of B smaller than the frequency of A (wherein B designates a positive value). In other words, the smaller the frequency when IPM 204 is operated, the faster filter capacitor 230 and smoothing capacitor 232 can be electrically discharged. In contrast, the smaller the frequency when IPM 204 is operated, the greater the current flowing in IPM 204, that is, the current flowing in converter 200.

Consequently, the current flowing in converter 200 can be controlled by changing the frequency at which IPM 204 is operated, that is, the frequency at which converter 200 is operated.

Hence, converter 200 may be controlled so as to decrease the frequency at which IPM 204 is operated, that is, the frequency at which converter 200 is operated during the electric discharging of filter capacitor 230 and smoothing capacitor 232.

For example, the current flowing in converter 200 is monitored by using a current sensor, and further, the frequency at which converter 200 is operated may be decreased such that the current flowing in converter 200 becomes as great as possible within a rated current of converter 200.

Figure 11:
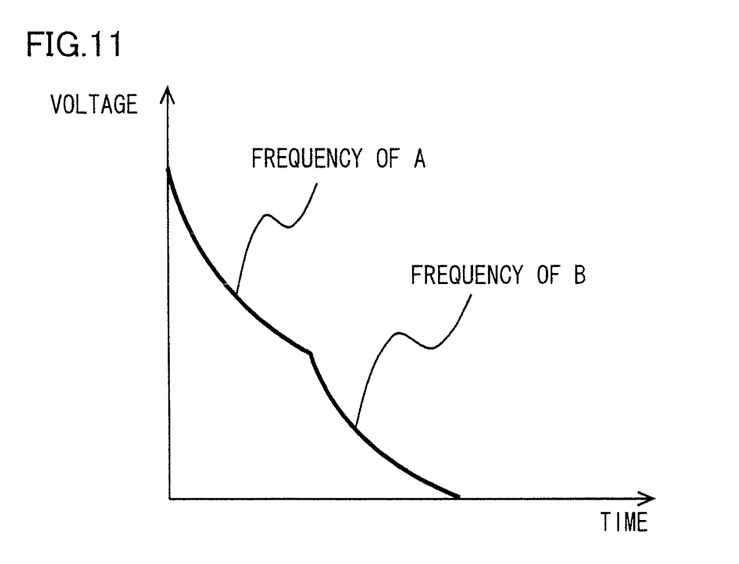
FIG. 11 is a graph illustrating a voltage when the frequency for actuating the IPM is changed.

In this case, the frequency at which converter 200 is operated is decreased so as to increase the current which is decreased due to the decrease in voltage. As a consequence, as illustrated in FIG. 11, as voltage VL of filter capacitor 230 and voltage VH of smoothing capacitor 232 become smaller, IPM 232 can be operated at a smaller frequency. In other words, as an elapsed period of time after the start of the electric discharging becomes longer, IPM 232 can be operated at a smaller frequency. In this manner, a period of time required for the electric discharging can be shortened.

It is to be understood that the preferred embodiment described herein should be merely illustrative, and therefore, should not be restrictive. The scope of the present invention is recited in not the above description but claims, and therefore, intends to encompass all of alterations in the significance equivalent to the claims and within the claims.

REFERENCE SIGNS LIST 100 engine, 110 first MG, 120 second MG, 130 power control unit, 140 power split device, 142 decelerator, 150 battery, 160 front wheel, 170 PM-ECU, 172 MG-ECU, 200 converter, 202 reactor, 210 first inverter, 220 second inverter, 230 filter capacitor, 232 smoothing capacitor, 234 DC/DC converter, 236 casing, 240 npn-type transistor, 242 diode, 250 npn-type transistor, 252 diode, 260 SMR

The invention claimed is:

1. A power control unit comprising:
   a converter that outputs a voltage higher than or equal to a voltage on one side from the other side whereas outputs a voltage lower than or equal to the voltage on said other side from said one side;
   a first capacitor connected onto said one side of said converter;
   a second capacitor connected onto said other side of said converter;
   a controller that operates to control said converter with power reserved in said first capacitor and supplied to the controller; and
   a casing that houses therein said first capacitor, said second capacitor, said converter, and said controller;
   said converter including:
   a first switching element connected between a positive electrode terminal and a negative electrode terminal in said first capacitor; and
   a second switching element connected between the positive electrode terminal in said first capacitor and a positive electrode terminal in said second capacitor; and
   said controller controlling said converter so as to alternately turn on said first switching element and said second switching element and prolong a time at which said second switching element is ON more than a time at which said first switching element is ON, in order to electrically discharge said first capacitor and said second capacitor.

2. The power control unit according to claim 1, wherein said controller controls said converter such that said first switching element and said second switching element are operated in a predetermined duty ratio.

3. The power control unit according to claim 1, wherein said controller controls said converter so as to decrease frequencies at which said first switching element and said second switching element are operated during electric discharging of said first capacitor and said second capacitor.

4. A controlling method for a power control unit, said power control unit including a converter that outputs a voltage higher than or equal to a voltage on one side from the other side whereas outputs a voltage lower than or equal to the voltage on said other side from said one side, a first capacitor connected onto said one side of said converter, a second capacitor connected onto said other side of said converter, a controller that operates to control said converter with power reserved in said first capacitor and supplied to said controller and a casing that houses therein said first capacitor, said second capacitor, said converter, and said controller, said converter including a first switching element connected between a positive electrode terminal and a negative electrode terminal in said first capacitor and a second switching element connected between the positive electrode terminal in said first capacitor and a positive electrode terminal in said second capacitor, the method comprising the step of:
   controlling said converter so as to alternately turn on said first switching element and said second switching element and prolong a time at which said second switching element is ON more than a time at which said first switching element is ON, in order to electrically discharge said first capacitor and said second capacitor.

5. The controlling method for a power control unit according to claim 4, wherein the step of controlling said converter includes the step of controlling said converter such that said first switching element and said second switching element are operated in a predetermined duty ratio.

6. The controlling method for a power control unit according to claim 4, wherein the step of controlling said converter includes the step of controlling said converter so as to decrease frequencies at which said first switching element and said second switching element are operated during electric discharging of said first capacitor and said second capacitor.

* * * * *